(12) United States Patent
Cohen

(10) Patent No.: US 6,379,455 B1
(45) Date of Patent: Apr. 30, 2002

(54) CHEMICAL AGENT FOR IMPROVING THE ENGINEERING PROPERTIES OF SOIL

(75) Inventor: Josy Cohen, Western Cape (ZA)

(73) Assignee: Road Building International (Barbados) Limited (BB)

( * ) Notice: Subject to any disclaimer, the term of this patent is extended or adjusted under 35 U.S.C. 154(b) by 0 days.

(21) Appl. No.: 09/620,142

(22) Filed: Jul. 20, 2000

Related U.S. Application Data

(63) Continuation of application No. PCT/ZA99/00015, filed on Apr. 15, 1999.

(51) Int. Cl.[7] .............................................. C04B 28/14
(52) U.S. Cl. ...................... 106/715; 106/711; 106/713; 106/714; 106/717; 106/718; 106/722; 106/773; 106/774; 106/789; 106/790; 106/791
(58) Field of Search ................................. 106/711, 715, 106/717, 722, 773, 774, 789, 790, 791, 713, 714, 718

(56) References Cited

U.S. PATENT DOCUMENTS 4,494,990 A * 1/1985 Harris ........................ 106/90

FOREIGN PATENT DOCUMENTS

| DE | 140 245 | 2/1980 |
|---|---|---|
| DE | 3929221 A1 | 3/1991 |
| EP | 0188618 A1 | 6/1984 |
| FR | 2753964 A1 | 9/1996 |
| WO | WO 99/52837 | 10/1999 |

* cited by examiner

Primary Examiner—Elizabeth D. Wood
(74) Attorney, Agent, or Firm—Hamilton, Brook, Smith & Reynolds, P.C.

(57) ABSTRACT

A chemical agent for improving the engineering properties of soil includes a mixture of cementitious pozzalans (5 to 60% by mass), calcium sulphate (20 to 80% by mass), an oxide of calcium (15 to 50% by mass) and silica oxide (1 to 30% by weight). Monofilament fibers can also be included in the mix.

20 Claims, 4 Drawing Sheets

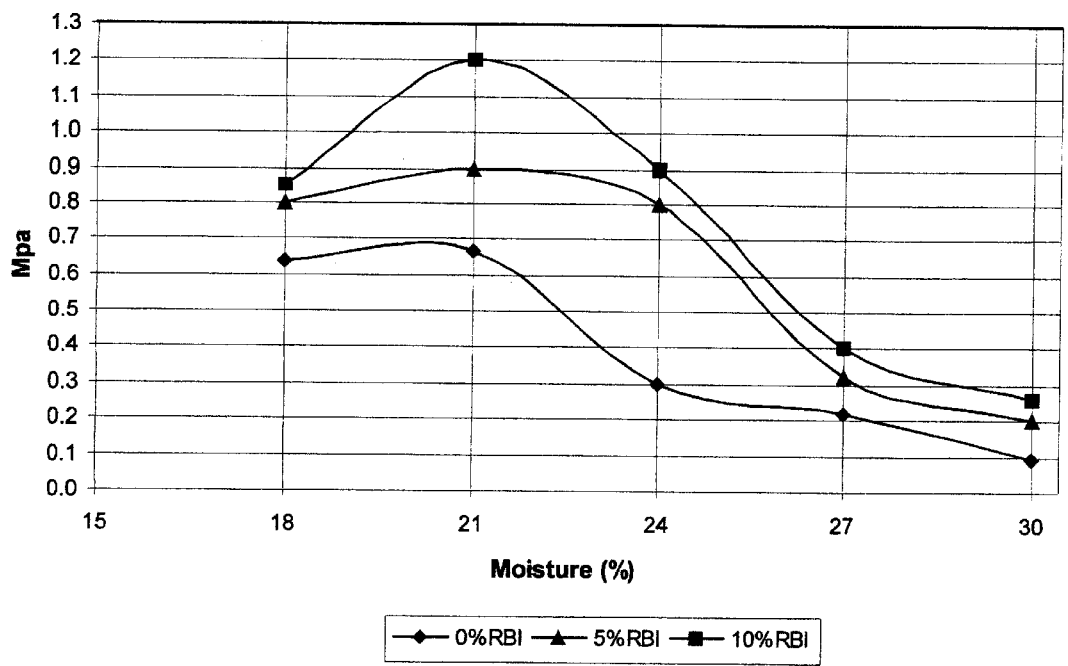

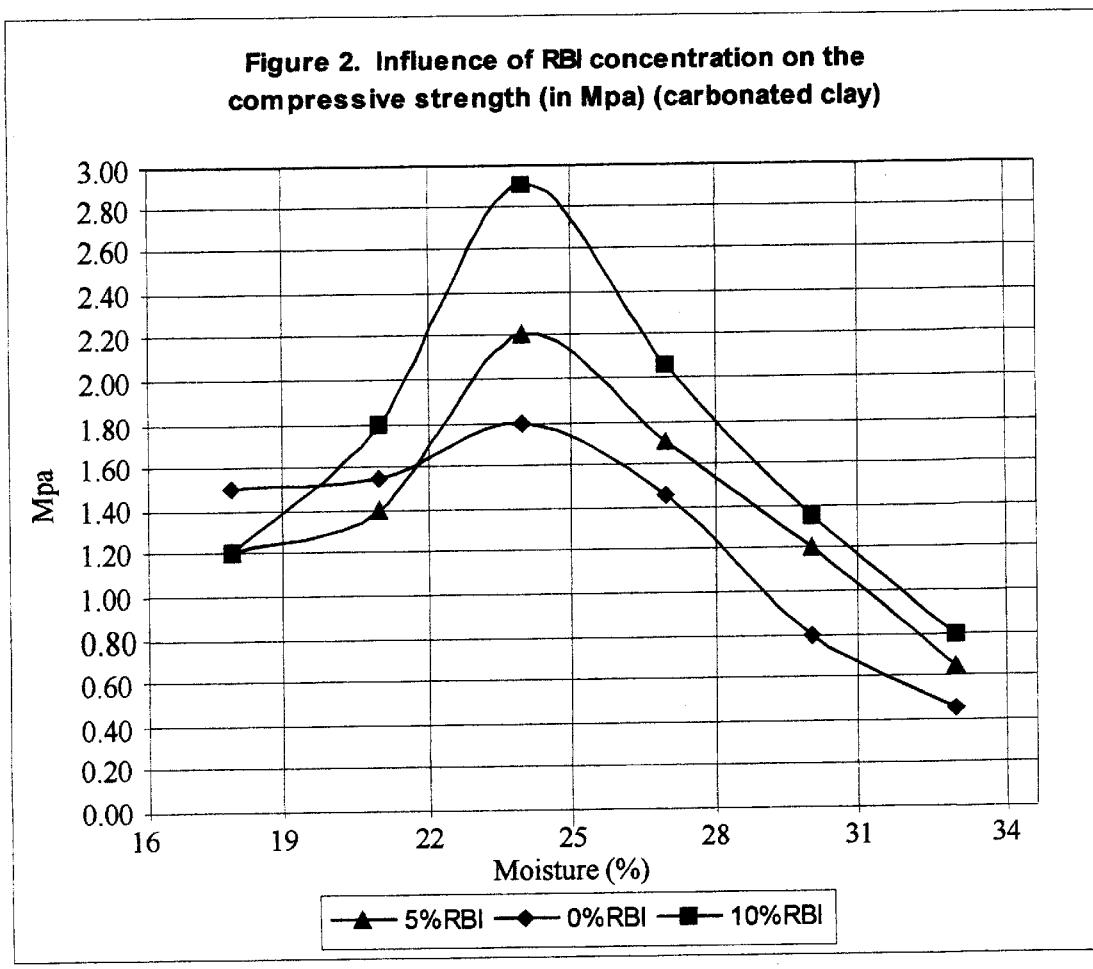

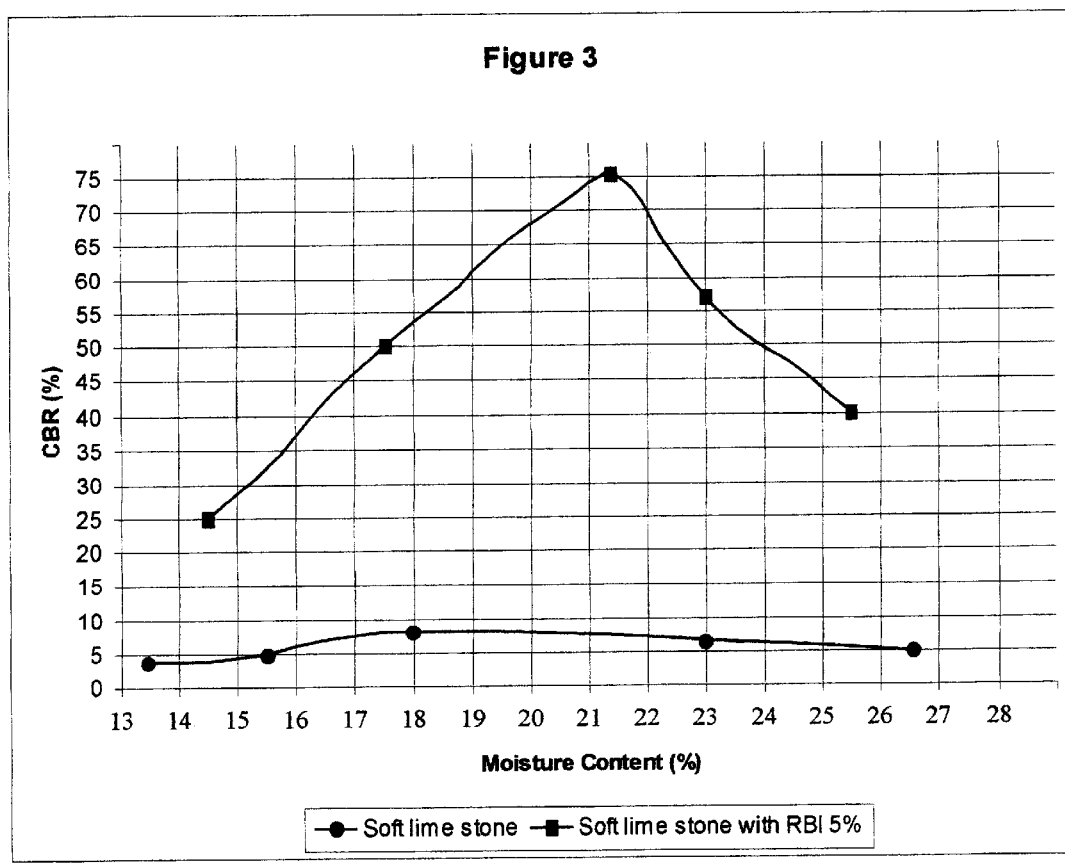

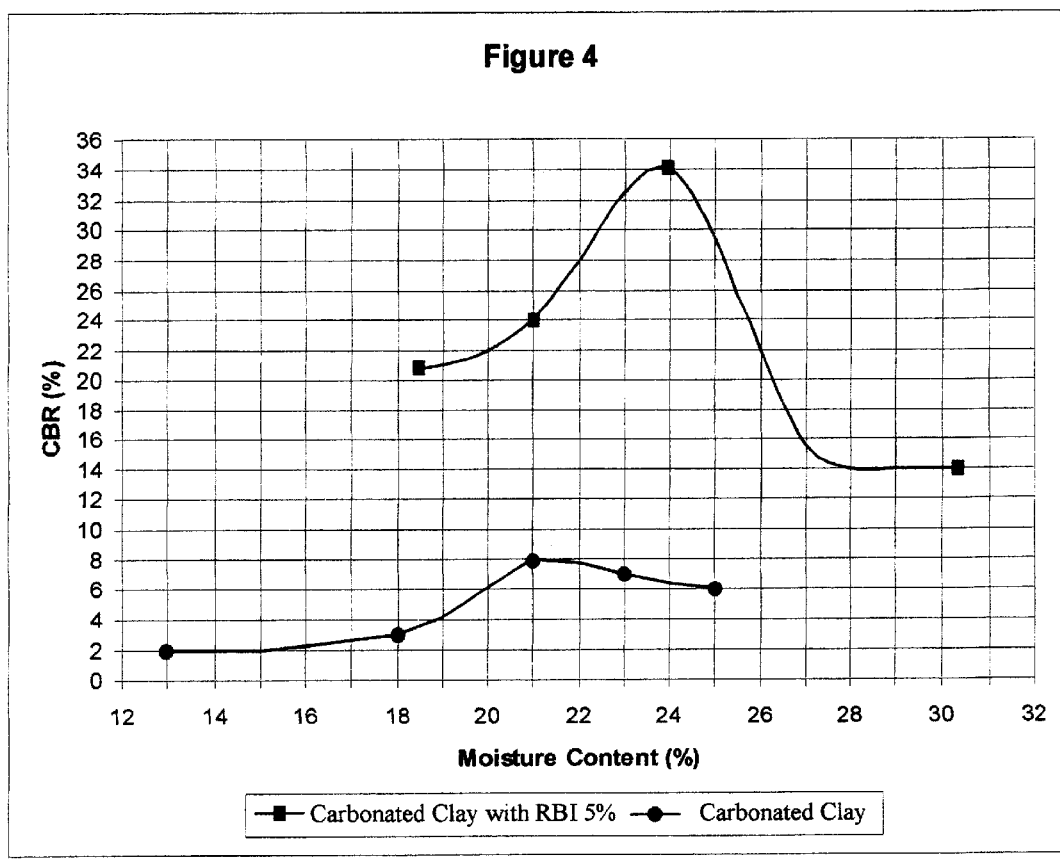

CHEMICAL AGENT FOR IMPROVING THE ENGINEERING PROPERTIES OF SOIL

RELATED APPLICATIONS

This application is a continuation of International Application No. PCT/ZA99/00015, filed on Apr. 15, 1999, designating the United States, which claimed priority to South African Patent Application 98/3162 filed on Apr. 15, 1998 and South African Patent Application 98/11687 filed on Dec. 21, 1998, the entire teachings of which are incorporated herein by reference.

FIELD OF THE INVENTION

THIS INVENTION relates to a chemical agent for improving the engineering properties of soil.

BACKGROUND TO THE INVENTION

In many civil engineering situations it is essential that the in situ soil have its engineering properties improved before being used in construction works. This is particularly important in road building where failure properly to stabilize the underlying soil can result in the road subsiding and/or cracking in use.

The simplest way of improving soil properties is by compacting it. However, because soils vary from sandy material through to clayey material, simply compacting the soil does not necessarily improve its engineering properties sufficiently to support whatever is constructed upon it. As a result of this it has been proposed to incorporate chemical agents into the soil to improve it and many stabilizers based on polymers have been used. These are successful in improving the soil's properties but only for a relatively short period of time. Eventually the polymer leaches out of the soil and its effect is lost.

Whilst the chemical agent of the present invention is intended specifically to stabilize an area which is to support a construction, it can also be mixed with soil and the resultant mixture pressed into moulds to form building elements for the construction of low cost housing.

BRIEF DESCRIPTION OF THE INVENTION

According to the present invention there is provided a chemical agent for improving the engineering properties of soil, the agent comprising:

between 5 and 60% by mass of a cementitious pozzalan;
between 20 and 80% by mass of calcium sulphate; and
between 15 and 50% by mass of an oxide of calcium.

It is preferred that the chemical agent for improving the engineering properties of soil comprise:

between 15 and 35% by mass of a cementitious pozzalan;
between 40 and 60% by mass of calcium sulphate; and
between 20 and 40% by mass of an oxide of calcium.

In a still further preferred form the chemical agent comprises:

between 25 and 30% by mass of a cementitious pozzalan;
between 30 and 40% by mass of calcium sulphate; and
between 25 and 35% by mass of an oxide of calcium.

The preferred pozzalan is blast furnace slag mixed with ordinary Portland cement, preferably in equal masses. Blast furnace slag is generally referred to as slagment.

The chemical agent can also includes additional pozzalans selected from ordinary Portland cement (referred to in the industry as OPC), sulphate-resisting cement, Portland cement 15 SL, Portland cement 15 FA, blends of ordinary Portland cement and fly ash, and masonry cement.

The chemical agent can include reinforcing fibres such as fibres of a synthetic plastics material. Preferred fibres are monofilaments of polypropylene.

Between 1 kilogram and 10 kilograms of fibres can be added to each 100 kilograms of chemical agent.

The oxide of calcium can be in the form of calcium oxide (CaO) or calcium hydroxide ($Ca(OH)_2$). The calcium sulphate can be mineral gypsum or partially dehydrated gypsum ($CaSO_4.1/2\ H_2O$)

In one form the chemical agent includes 1 to 30% by mass of silica oxide ($SiO_2$).

A specific form of chemical agent which is particularly suitable for use in improving the properties of a road surface comprises:

| | |
|---|---|
| mineral gypsum ($CaSO_4$) | 35% by mass |
| quartz sand | 12% by mass |
| calcium oxide or calcium hydroxide | 25% by mass |
| Portland blast furnace cement | 28% by mass |

According to a further aspect of the present invention there is provided a method of improving the engineering properties of soil which comprises scarifying the soil to break up and pulverize the soil, applying the chemical agent described above over the soil, mixing the soil and chemical agent, and thereafter compacting the soil.

According to a still further aspect of the present invention there is provided a method of manufacturing building blocks from soil which comprises breaking up the soil, mixing it with the chemical agent, compacting the mixed soil and chemical agent into a mould, and allowing the mixed soil and chemical agent to set and harden.

BRIEF DESCRIPTION OF THE DRAWINGS

FIG. 1 shows a graph of the influence of RBI concentration on compressive stress of soft limestone.

FIG. 2 shows a graph of the influence of RBI concentration on compressive stress of carbonated clay.

FIG. 3 shows a graph of California Bearing Ratio (CBR) versus moisture content for limestone.

FIG. 4 shows a graph of CBR versus moisture content of carbonated clay.

DETAILED DESCRIPTION OF THE INVENTION

EXAMPLE 1

The chemical agent according to the present invention can be used, in the manner to be described, to improve the soil properties of a gravel or dirt road which is to be concreted, tarred, brick-paved or sealed with a bituminous surface seal. The road can, however, after improvement be used without tarring or concreting, the improved soil forming the surface on which the traffic runs.

The existing gravel road is scarified down to the depth to which stabilization is required. Scarifying breaks up and pulverizes the existing road surface layer after which the in situ soil is mixed thoroughly by means of a grader or rotovator.

A chemical agent having the following constituents is then spread as a layer over the scarified surface at the predetermined dosage that has been determined by laboratory tests. Such tests are described hereinafter with reference to Examples 2 etc.:

| | |
|---|---|
| mineral gypsum (CaSO$_4$) | 35% by mass |
| quartz sand | 12% by mass |
| calcium oxide (CaO) or calcium hydroxide (Ca(OH)$_2$) | 25% by mass |
| Portland blast furnace cement | 28% by mass |

The mineral gypsum and quartz sand are available premixed. The mixture is sold under the trade name "Cretestone". The total amount of Cretestone used is 47% by mass. Portland blast furnace cement comprises slagment (the residue from blast furnaces) which is crushed and mixed with an equal mass of OPC (ordinary Portland cement). A kilogram of reinforcing fibres can be added per hundred kilograms of the above mixture. Other products which can be used are CB Plaster and Hydrostone, each of which contains mineral gypsum and quartz sand.

The amount of agent applied varies with the nature of the soil type and also as a function of the most economical dosage for the soil type but is generally in the range of 2% to 10% by mass of the soil that is to be improved.

The chemical agent is then thoroughly mixed into the scarified layer until a homogeneous layer has been obtained. Experimental work has shown that a Rotovator intimately mixes the chemical agent with the soil in a most satisfactory manner.

Water is now added and mixed in until evenly distributed throughout the mixture and until the OMC (optimum moisture content) of the stabilized soil has been reached as determined in the laboratory beforehand.

The stabilized layer is then compacted using road compactors until the specified layer density has been achieved. Finally the stabilized layer is graded to final road level and compacted until a smooth surface layer has been obtained.

Experimental work has shown that the chemical agent used does not leach out of the soil after the agent has set.

EXAMPLE 2

A soil was tested in Malaysia. The soil was a silty (clayey) sand which was classified as A 2-6. It was tested using the standard unconfined compressive strength (UCS) and California Bearing Ratio (CBR) tests. The chemical agent used was that described in Example 1.

The soil sample had the following characteristics:

| | |
|---|---|
| Plasticity index | 12 (on material <0,425 mm) |
| MDD (maximum dry density) | 2039 Kg/m$^3$ |
| OMC (optimum moisture content) | 9,2% |

| Test Result UCS | |
|---|---|
| % chemical agent | Mpa |
| untreated | 0,67 |
| 2% | 2,22 |
| 4% | 2,54 |
| 6% | 2,85 |

| Test Result CBR | | | | |
|---|---|---|---|---|
| % chemical agent | % CBR at % compaction of MDD | | | |
| | 93 | 95 | 98 | 100 |
| Untreated | 8 | 13 | 25 | 39 |
| 2% | 16 | 26 | 50 | 79 |
| 4% | 33 | 52 | 104 | 165 |
| 6% | 66 | 106 | 210 | 340 |

From this test it can be concluded that the strength of the treated material increased between 3 and 4 times with respect to the original strength.

EXAMPLE 3

Two samples were tested in Israel by the Standard Institute of Israel. Sample 1 was a soft lime stone gravel. Sample 2 comprised green carbonated clay. Table 1 gives the properties of the two samples.

The tests were carried out on sample cylinders with a diameter of 35 mm and a height of 80 mm. Measures and method of preparation of the samples were chosen according to standard ASTMD 2850-87 "Standard Test Method for Unconsolidated, Undrained Compressive Strength of Cohesive Soils in Triaxial Compression".

FIGS. 1 and 2 show the influence of the chemical agent of Example 1 on the strength of samples 1 and 2 respectively. FIGS. 3 and 4 show the results of the CBR tests on samples 1 and 2. It will be noted that with increasing percentages of the chemical agent in accordance with the present invention, the properties of the samples are greatly enhanced. The term RBI means a chemical agent having the composition described in Example 1.

EXAMPLE 4

If used in the production of building elements such as bricks or blocks, the chemical agent of Example 1 s mixed with soil. For example, it can be mixed with the soil that is removed to form the foundation of a building. The mixture is then placed in moulds and compacted into the moulds. Once the mixture has set sufficiently, the building element is removed from the mould and allowed to set before being used for building purposes.

EXAMPLE 5

A gravel from Sri Lanka having the following properties was tested.

| Gravel Source | Material Description | Plasticity Index | MDD (kg/m$^2$) | OMC (%) | CBR at 100% std density |
|---|---|---|---|---|---|
| Getamane Raja Maha Vihara (Matara District) | Ferruginous gravel | 11 | 1900 | 12,6 | 24 |

After mixing the sample with 6% by mass of the chemical agent of Example 1 the following CBR test results were obtained.

| Unstabilized material | | | Stabilized with 6% RBI 81 CBR at % AASHTO-density | | | | |
|---|---|---|---|---|---|---|---|
| MDD | | CBR at 100% std | | | | | |
| kg/m³ | OMC % | density | 100 | 98 | 95 | 93 | 90 |
| 1900 | 12,6 | 24 | 213 | 150 | 88 | 62 | 37 |

It can be deduced that CBR value at 100% standard density has increased significantly from a value of 24 to 213 i.e. between 8 and 9 times when stabilized with 6% chemical agent compared to the unstabilized CBR-value. This indicates that there is a significant increase in CBR-strength when stabilizing with chemical agent.

EXAMPLE 6

A silty, clayey sand with gravel dispersed in it and having the following properties was used in this test:

| Sieve size (mm) % Passing | | | | | | | | | | Atterberg Units | | |
|---|---|---|---|---|---|---|---|---|---|---|---|---|
| 75 | 63 | 53 | 37.5 | 26.5 | 10.9 | 13.2 | 4.75 | 2.00 | 0.245 | 0.075 | LL | PL | PI |
| 100 | 95 | 92 | 90 | 88 | 82 | 76 | 58 | 47 | 35 | 13 | 18 | 13 | 5 |

The soil was classified, according to the AASHTO classification, as A.1-b.

The chemical agent mixed with the soil for test purposes had the following composition:

| | |
|---|---|
| gypsum ($CaSO_4$) | 33% by mass |
| lime (unslaked) CaO | 27% by mass |
| OPC/slagment | 27% by mass |
| quartz sand | 13% by mass |

The following results were obtained by CBR testing:

| Percentage of chemical agent | Untreated | 2% | 4% | 6% |
|---|---|---|---|---|
| CBR @ 98% AASHTO-density | 130 | 207 | 270 | 285 |

The bearing strength of the soil increased significantly. Maintenance of the road treated decreased significantly. There was less potholing and loss of gravel from the surface during wet weather.

EXAMPLE 7

A sample of a brown granite gravel was obtained from a road in the province of KwaZulu Natal. The sample had the following properties and was again classified as A.1-b:

| (mm) Sieve size: % passing | | | | | | | | Atterberg limits | | |
|---|---|---|---|---|---|---|---|---|---|---|
| 35.7 | 26.5 | 19.0 | 13.2 | 4.75 | 2.00 | 0.425 | 0.075 | LL | PL | PT |
| — | 100 | 97 | 93 | 73 | 63 | 30 | 11 | — | — | SP |

The composition of the chemical agent used was as follows:

| | |
|---|---|
| CB plaster ($CaSO_4$) | 60% by mass |
| hydrated lime ($Ca(OH)_2$) | 15% by mass |
| slagment and OPC in equal quantities | 27% by mass |

The following results were obtained from CBR testing:

| | | CBR @ 98% AASHTO density | |
|---|---|---|---|
| MDD | OMC | Natural | 4% chemical agent |
| 2080 | 6,8 | 11 | 103 |

The bearing strength CBR of the treated sample increased dramatically with respect to the untreated sample. The final product was hard and could well serve as a road surface. It was, however, not as durable as applicant desired and the high percentage of expensive gypsum made the product too expensive for general use. The chemical agent could well be used where the treated soil is a sub-layer that is covered by bitumen, concrete etc.

EXAMPLE 7

A crushed stone aggregate plus soil, and believed to be of sandstone or granite origin, was taken from a secondary road in a housing area. The road exhibited potholes, corrugations and erosion due to inadequate surface water drainage. The AASHTO classification was again A.1-b. The soil's properties were as follows:

| Atterberg limits | LL | PL | PT |
|---|---|---|---|
| | — | — | SP |

| Sieve size (mm) % passing | | | | | | | | |
|---|---|---|---|---|---|---|---|---|
| 53 | 37,5 | 26,5 | 19,0 | 13,2 | 4,75 | 2,00 | 0,425 | 0,075 |
| 100 | 98 | 96 | 94 | 90 | 77 | 69 | 46 | 11 |

The composition of the agent used to treat the sample was as follows:

| | |
|---|---|
| gypsum (CaSO$_4$) | 60% by mass |
| lime(Ca(OH)$_2$) | 20% by mass |
| slagment/OPC | 20% by mass |

It will be noted that the agent did not include any quartz sand.

The resultant road surface was hard and durable but the product was too expensive for general use due to the high gypsum content.

EXAMPLE 7

Tests were carried out on a fine sand classified as A.3. The chemical composition of the agent used was as follows:

| | |
|---|---|
| gypsum (CaSO$_4$) | 45% by mass |
| lime(Ca(OH)$_2$) | 50% by mass |
| cement (OPC) and blast furnace slag | 5% by mass |

The CBR test gave the sand before treatment a reading of 30 and the sand after treatment with 5% by mass of the chemical agent a reading of 178. The final product, however, broke-up when excessive pressure was exerted on it by passing traffic. It is thus too weak for use as a surface layer but adequate for use as a sub-layer in areas which do not carry heavy loads.

Soils, whether sandy or clayey, respond to treatment with a mixture of pozzalan, calcium sulphate and an oxide of calcium and show improved CBR values. Some chemical agents, in accordance with the present invention, particularly those using a high percentage of calcium sulphate, are too expensive for general purpose use to improve the engineering properties of soil which is to become the top layer or a sub-layer of a road. However, they are usable to treat smaller areas where a substantial improvement in properties are required. Other chemical agents improve the CBR values but the treated soil is less durable than is necessary for a road surface. Soils treated with these agents are suitable as sub-layers over which a brick, concrete, bitumen etc layer is applied.

To produce the chemical agent the requisite amounts of CaO and CaSO$_4$ are weighed and mixed until the mixture is homogeneous. The requisite amount of quartz sand is then mixed in until the mixture is homogeneous. Finally the cementitious pozzalan is mixed into the CaO, CaSO$_4$ and quartz sand mixture.

Various types of lime can be used. The following are examples:

| Type of lime | CaO/MgO | CaO + MgO Slaked | (% m/m) Quick | Available lime Slaked | (% m/m) Quick |
|---|---|---|---|---|---|
| Calcium | ≧140 | 75 | 85 | 50 | 80 |
| Magnesium | ≧2,0 – <14,0 | 75 | 75 | 35 | 35 |
| Dolomitic | ≧1,3 – <2,0 | 75 | 75 | 30 | 30 |

The magnesium content should be less than 5% by mass and the ratio of calcium oxide to magnesium oxide should be greater than 14 to 1.

TABLE 1

| Sample No. | Passing through sieve No. (%): | | | | | | | | | | Atterberg Limits (%) | | | AASHTO Classification | Free Swell (%) | Natural Moisture (%) |
|---|---|---|---|---|---|---|---|---|---|---|---|---|---|---|---|---|
| | 3" | 2" | 1.5" | 3/4" | 3/8" | 4# | 10# | 40# | 80# | 200# | LL | PL | PI | | | |
| 1 | 100 | 98 | 97 | 95 | 91 | 86 | 83 | 78 | 76 | 74 | 56 | 24 | 32 | A-7-6 (24) | 11.2 | 11.2 |
| 2 | | | | | | | 100 | 99 | 98 | 97 | 63 | 24 | 39 | A-7-6 (44) | 14.6 | 19.6 |

What is claimed is:

1. A method for improving the engineering properties of soil which comprises scarifying the soil to break up and pulverize the soil, applying to the soil a chemical agent comprising:
   between 5 and 60% by mass of a cementitious pozzalan;
   between 20 and 80% by mass of calcium sulphate; and
   between 15 and 50% by mass of an oxide of calcium,
mixing the soil and chemical agent, and thereafter compacting the soil.

2. A method of claim 1 wherein said agent comprises:
   between 15 and 35% by mass of a cementitious pozzalan;
   between 40 and 60% by mass of calcium sulphate; and
   between 20 and 40% by mass of an oxide of calcium.

3. A method of claim 1, wherein said agent comprises:
   between 25 and 30% by mass of a cementitious pozzalan;
   between 30 and 40% by mass of calcium sulphate; and
   between 25 and 35% by mass of an oxide of calcium.

4. A method of claim 1, wherein the pozzalan includes blast furnace slag cement.

5. A method of claim 1, wherein the pozzalan includes blast furnace slag cement and the chemical agent also includes additional pozzalans selected from ordinary Portland cement, mineral gypsum and partially dehydrated gypsum.

6. A method of claim 1, wherein the chemical agent comprises equal masses of blast furnace slag cement and ordinary Portland cement.

7. A method of claim 1 and including the step of mixing reinforcing fibers into the chemical agent.

8. A method of claim 1, and including the step of mixing reinforcing fibers into the chemical agent, the fibers being of a synthetic plastics material.

9. A method of claim 1, wherein the oxide of calcium is in the form of calcium oxide (CaO) or calcium hydroxide (Ca(OH)$_2$).

10. A method of claim 1 and including 1 to 30% by mass of silica oxide.

11. A method for manufacturing building blocks from soil which comprises breaking up the soil, mixing it with a chemical agent comprising:

between 5 and 60% by mass of a cementitious pozzalan;

between 20 and 80% by mass of calcium sulphate; and between 15 and 50% by mass of an oxide of calcium, compacting the mixed soil and chemical agent into molds, and allowing the mixed soil and chemical agent to set and harden.

12. A method of claim 11 wherein said agent comprises:

between 15 and 35% by mass of a cementitious pozzalan;

between 40 and 60% by mass of calcium sulphate; and between 20 and 40% by mass of an oxide of calcium.

13. A method of claim 11, wherein said agent comprises:

between 25 and 30% by mass of a cementitious pozzalan;

between 30 and 40% by mass of calcium sulphate; and between 25 and 35% by mass of an oxide of calcium.

14. A method of claim 11, wherein the pozzalan includes blast furnace slag cement.

15. A method of claim 11, wherein the pozzalan includes blast furnace slag cement and the chemical agent also includes additional pozzalans selected from ordinary Portland cement, mineral gypsum and partially dehydrated gypsum.

16. A method of claim 11, wherein the chemical agent comprises equal masses of blast furnace slag cement and ordinary Portland cement.

17. A method of claim 11 and including the step of mixing reinforcing fibers into the chemical agent.

18. A method of claim 11 and including the step of mixing reinforcing fibers into the chemical agent, the fibers being of a synthetic plastics material.

19. A method of claim 11, wherein the oxide of calcium is in the form of calcium oxide (CaO) or calcium hydroxide ($Ca(OH)_2$).

20. A method of claim 11 and including 1 to 30% by mass of silica oxide.

* * * * *